April 23, 1957 R. B. LEW 2,789,498
MULTI-COLOR MACHINE FOR PRINTING FABRICS
Filed July 27, 1953 2 Sheets-Sheet 2
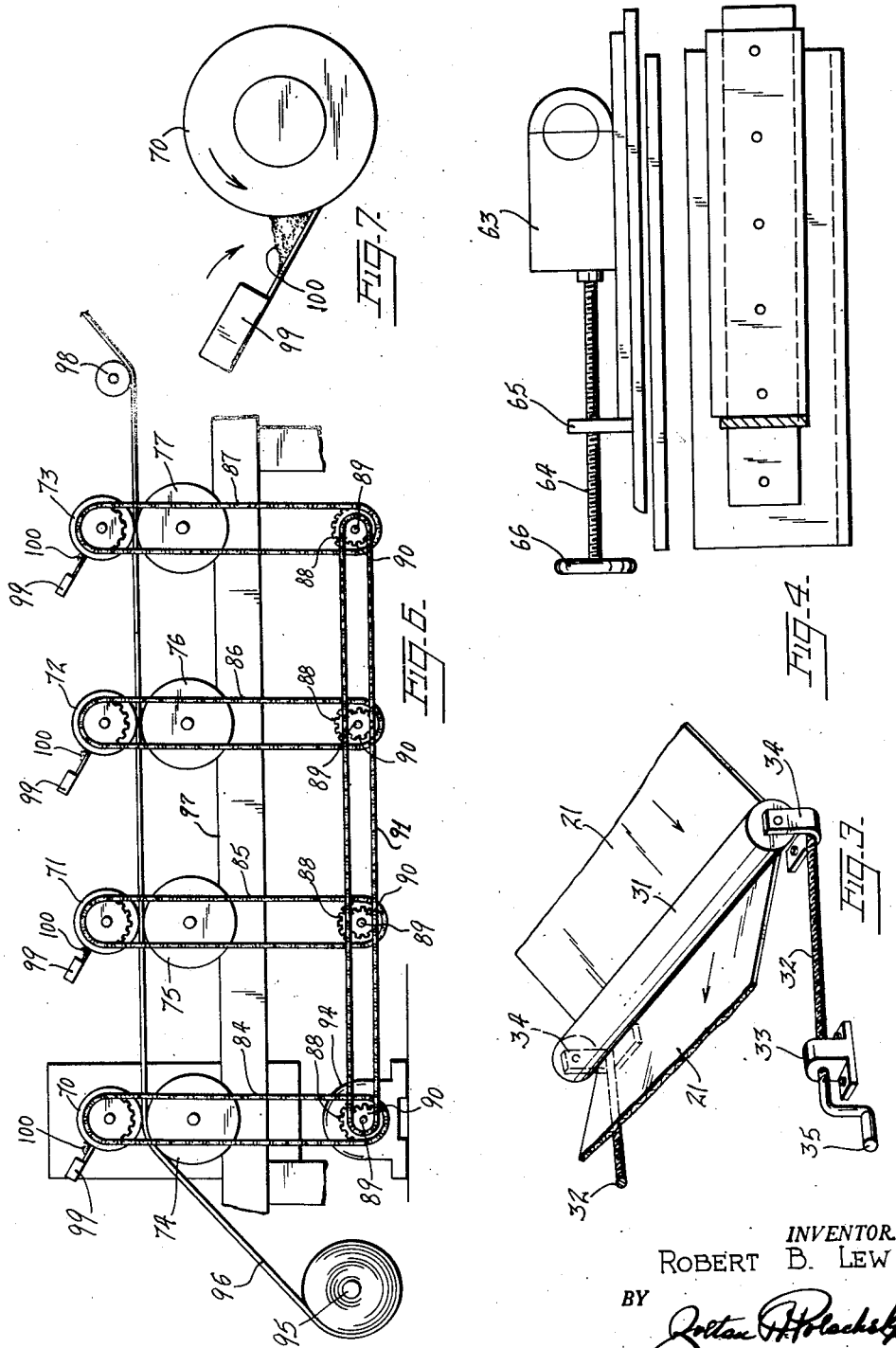
INVENTOR.
ROBERT B. LEW
BY
ATTORNEY 2,789,498

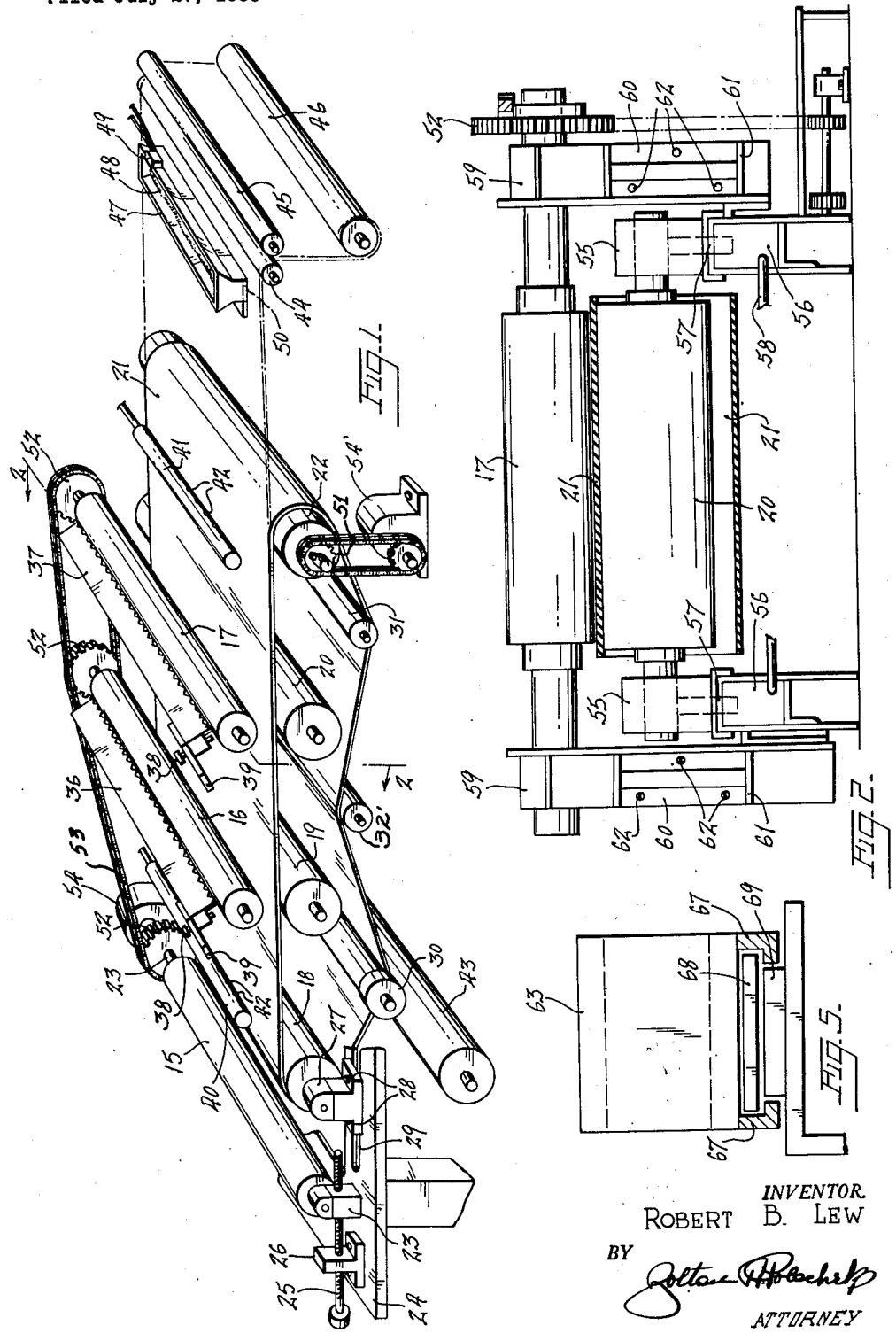

United States Patent Office

Patented Apr. 23, 1957

2,789,498

MULTI-COLOR MACHINE FOR PRINTING FABRICS

Robert B. Lew, Brooklyn, N. Y.

Application July 27, 1953, Serial No. 370,394

2 Claims. (Cl. 101—181)

This invention relates to new and useful improvements in machines for printing textile and plastic goods in multicolors.

More particularly, the present invention proposes the construction of an improved machine for printing textile and thermoplastic sheet material in multicolors which will permit such material to be fed continuously and rapidly through the machine and imprinted with multicolors without smearing or blurring of the colors.

Another object of the present invention proposes forming a machine with printing rolls each having a doctor blade mounted adjacent to it which is adjustable to vary the amount of coloring matter supplied to the roll for printing.

Still further, the present invention proposes constructing the machine so that the printing rolls may be independently driven to continue their rotation after the material to be printed has passed through them so that the coloring matter will not dry on the rolls.

As a further object, the present invention proposes arranging the machine with an adjustable feed blanket with means to tighten and align the blanket.

The present invention further proposes a novel arrangement of feeding means, color applying means, and means to adjust and vary the distance between printing rolls and pressure backing rolls with auxiliary drying means so that a continuous process of printing can be carried on by the machine.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view with parts broken away of a multicolor fabric printing machine constructed and arranged in accordance with the present invention.

Fig. 2 is a section taken on line 2—2 of Fig. 1.

Fig. 3 is a fragmentary perspective view of the feed blanket and idler roller shown in Fig. 1 and showing means to adjust the roller to tighten the blanket.

Fig. 4 is a fragmentary detail side view of one end of the machine shown in Fig. 1 but illustrating a modification.

Fig. 5 is an end view, partly in section, of a portion of the structure shown in Fig. 4.

Fig. 6 is a side view of a machine similar to that shown in Fig. 1 but without the feed blanket and illustrating another modification of the present invention.

Fig. 7 is an enlarged side end view of one of the printing rollers and doctor knives shown in Fig. 6.

The fabric and plastic multicolor printing machine, in accordance with the first form of the invention illustrated in Figs. 1, 2 and 3, has a series of spaced printing rolls 15, 16 and 17, preferably copper rolls, and a plurality of pressure backing rolls 18, 19 and 20, preferably of rubber or rubber coated. One of the pressure backing rolls is disposed adjacent each printing roll, pressure roll 18 being disposed adjacent printing roll 15, pressure roll 19 adjacent printing roll 16 and pressure roll 20 adjacent printing roll 17.

An endless blanket 21, preferably of rubber, encircles the pressure rolls 18, 19 and 20 and is disposed between these rolls and the printing rolls 15, 16 and 17. Within the endless belt or blanket 21 is also rotatably disposed an end roll 22 which may serve as another pressure roll if another printing roll (not shown) is added.

Printing roll 15 is rotatably mounted in a pair of movable bearings 23 each of which is moved on the table 24 by a thread rod 25 (only one rod being shown) passing through it and through a stationary bracket 26. A stationary pillow block or bearing 27 rotatably holds the pressure backing roll 18 at each end.

Each pillow block or bearing 27 (only one being shown, the two being identically arranged and constructed) while stationary preferably is secured by bolts 28 which pass through slots 29 in table 24 so that the bearings 27 may be moved to various positions on the table the length of the slots and secured there. In this manner means is provided to move the adjacently disposed pressure roll 18 and printing roll 15 and to serve as adjustable tensioning means to tighten the blanket.

Also encircled by the endless blanket 21 is a rotatably mounted roller 30 with enlarged ends beyond the side edges of the blanket. Roller 30 serves as means to hold the blanket in alignment with the pressure rolls straightening it as it tends to go to the left or right side of the machine.

In addition, the rubber endless blanket 21 also encircles an idler roller 31 and another idler roller 32' bears against the blanket being rotatably mounted on the machine below the blanket. Preferably, the idler roller 31 is mounted so that its position on the machine can be changed to tighten or loosen the blanket 21 as shown in Fig. 3. A pair of threaded rods 32, each passing through a bracket 33 fixed to the machine, is rotatably secured to roller supports 34, one end of each rod being secured to one of the roller supports 34. A crank 35 is provided on the other end of each rod 32 to rotate the rod and adjust the position of the roller.

Doctor knives 36 and 37, one for each printing roll, provide means to feed varying predetermined amounts of coloring matter separately to each of the printing rolls. Doctor knives 36 and 37 are adjustably mounted as by threaded bolts 38 to supports 39 fixed to the machine. Knife 36 is disposed adjacent printing roll 16 and knife 37 adjacent roll 17.

Air pipes 40 and 41, disposed above the blanket 21, are provided to accelerate the drying of material printed in the machine. The air pipes are connected to a source of compressed air (not shown) and have jet outlet orifices 42. Pipe 40 is placed behind the first printing roll 15 and air pipe 41 behind the last printing roll 17.

A supply roll 43 of fabric or plastic sheeting to be printed is rotatably disposed beneath the machine and the material passed between rolls 15 and 18 on the blanket and beneath printing rolls 16 and 17 which may each contain a chromatically different color. To assist in drying the printed material before it passes through guide rollers 44 and 45 to a storage roll 46 rotatably mounted beneath the machine, a drying powder hopper 47 with drying powder 48 in it is mounted on the machine above the path of the printed material. An electrically operated buzzer type vibrator 49 provides means to shake the powder 48 through the restricted opening 50 in the bottom of the hopper 47.

A silent chain driving gear or sprocket 51 is provided on the end of roll 22 to drive the entire machine. In addition each of the printing rolls has a sprocket 52 and is connected together by a chain 53 and a motor 54 of the same speed as the main drive motor 54' drives the printing rolls separately and independently of the main drive so that they may be continued to rotate after the main drive motor 54' has stopped. The two motors 54 and 54' are synchronized, running at the same speed.

The pressure backing rolls 18, 19 and 20 are mounted in bearing 55 (see Fig. 2) and raised and lowered by air cylinders 56 and pistons 57 connected by pipes 58 to a source of compressed air (not shown) or other fluid. The printing rolls 16 and 17 are mounted in bearings 59 (see Fig. 2) which are secured to the frame of the machine by plates 60 and 61 which may be moved relative to one another to raise or lower the printing rolls and which are secured together by bolts 62.

The sprockets 52 on the printing rolls may also be connected to the main drive as indicated in Fig. 2.

An alternate method of adjustably securing the printing roll 15 to the machine is shown in Figs. 4 and 5. A pair of pillow blocks 63 (only one of which is shown) is used. One end of a thread rod 64 extends into each block 63 and through a stationary bracket 65. A wheel 66 at the end of rod 64 provides means to turn it. The pillow blocks have brackets 67 (see Fig. 5) which extend over the edges of a plate 68 secured to a narrower plate 69 fixed to the frame of the machine.

The modification of the present invention shown in Figs. 6 and 7 is characterized by a machine having no feed blanket but only a series of spaced printing rolls 70, 71, 72 and 73 rotatably mounted and superposed over a plurality of pressure backing rolls 74, 75, 76 and 77.

The pressure backing rolls are freely rotatable and the printing rolls 70, 71, 72 and 73 over them are connected by vertical silent chains 84, 85, 86 and 87 to gears or sprockets 88 mounted on shafts 89 rotatably mounted on the machine. Additional gears or sprockets 90 on each shaft 89 and horizontal chains 91 (only one being shown) connect the printing rolls together. A main drive motor 94 drives all the printing rolls at the same time and at the same speed. A supply roll 95 of material to be printed 96 is rotatably mounted beneath the table 97 of the machine. The material 96 is threaded through the printing and pressure rolls and out the machine under a guide roller 98. The material 96 connects the printing rolls with the pressure rolls so that the printing rolls rotate them and feed the material through the machine.

Doctor knives 99 adjustably mounted adjacent the printing rolls provide means to supply the desired amount of coloring matter to the printing rolls.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a machine for printing textile and thermoplastic sheet material in multicolors, the combination of a series of spaced printing rolls, a plurality of pressure backing rolls one disposed adjacent each printing roll, a pair of spaced idler rollers, an endless blanket encircling the pressure rolls and one of the idler rollers and disposed between the pressure rolls and the printing rolls, said encircled idler roller being adjustable, said other idler roller bearing against the blanket, means to move the adjacently disposed pressure and printing rolls toward and away from one another, separate means adjacent each printing roll to feed varying predetermined amounts of coloring matter to such printing roll, means to drive the blanket and pressure and printing rolls, and means to drive the printing rolls independently of the pressure rolls and blanket to prevent the coloring matter drying on the printing rolls and adjustable tensioning means to tighten the blanket, and means to hold the blanket in alignment on the pressure rolls and on the idler roller, and means for adjusting said encircled idler roller.

2. The combination of claim 1 wherein said blanket alignment means is a rotatably mounted roller with enlarged ends beyond the side edges of the blanket and wherein the means for adjusting said encircled idler roller includes a threaded rod connected to said idler roller and a crank on the end of said rod for turning the same.

References Cited in the file of this patent

UNITED STATES PATENTS

| | | |
|---|---|---|
| 369,925 | Davidson | Sept. 13, 1887 |
| 444,412 | Lietze | Jan. 6, 1891 |
| 1,428,913 | Barber | Sept. 12, 1922 |
| 1,662,689 | Waldron | May 13, 1928 |
| 1,878,319 | Pinder | Sept. 20, 1932 |
| 2,003,799 | Barber | June 4, 1935 |
| 2,031,063 | Pesci | Feb. 18, 1936 |
| 2,201,008 | MacArthur | May 14, 1940 |
| 2,205,720 | Goebel et al. | June 25, 1940 |
| 2,387,332 | Kunz | Oct. 23, 1945 |
| 2,569,034 | Auer | Sept. 25, 1951 |
| 2,619,033 | Lembo | Nov. 25, 1952 |
| 2,649,044 | Dungler | Aug. 18, 1953 |